United States Patent [19]

Schonlau et al.

[11] Patent Number: 4,858,999
[45] Date of Patent: Aug. 22, 1989

[54] PRESSURE CONTROL UNIT WITH LOCKING DEVICE FOR DUAL CIRCUIT BRAKE SYSTEMS

[75] Inventors: Juergen Schonlau, Walluf; Peter Volz, Darmstadt; Ralf Harth, Oberursel, all of Fed. Rep. of Germany

[73] Assignee: Alfred Teves GmbH, Frankfurt am Main, Fed. Rep. of Germany

[21] Appl. No.: 36,448

[22] Filed: Apr. 8, 1987

[30] Foreign Application Priority Data

May 2, 1986 [DE] Fed. Rep. of Germany ....... 3614797

[51] Int. Cl.⁴ .......................... B60T 13/00; B60T 8/18
[52] U.S. Cl. .................. 303/9.63; 303/9.69; 188/195
[58] Field of Search ............... 188/195, 349; 303/6 A, 303/6 C, 22 R, 23 R, 6 R, 34 A, 92, 9.62, 9.63, 9.69, 9.72, 22.1, 22.4

[56] References Cited

U.S. PATENT DOCUMENTS

| | | | |
|---|---|---|---|
| 3,259,439 | 7/1966 | Bueler | 303/6 C |
| 3,269,782 | 8/1966 | Jolly | 303/22 R |
| 3,302,982 | 2/1967 | Pekrul | 303/22 R |
| 3,614,169 | 10/1971 | Bueler | 303/6 C |
| 3,754,792 | 8/1973 | Ishigami et al. | 303/84 A X |
| 3,771,835 | 11/1973 | Yabuta | 303/6 C |
| 3,910,640 | 10/1975 | Kozakai et al. | 303/9.63 |
| 3,910,648 | 10/1975 | Riesenberg | 303/92 |
| 3,914,736 | 10/1975 | Nakamura | 303/9.63 |
| 3,917,355 | 11/1975 | Takeuchi | 303/9.63 |
| 3,989,312 | 11/1976 | Unterberg | 303/22 R X |
| 4,005,401 | 1/1977 | Isikawa et al. | 303/9.63 |
| 4,027,924 | 6/1977 | Kondo | 303/92 |
| 4,097,841 | 6/1978 | Otsuka et al. | 303/9.63 |
| 4,217,004 | 8/1980 | Kawaguchi | 188/349 X |
| 4,229,049 | 10/1980 | Ando | 303/6 C |
| 4,571,007 | 2/1986 | Carmichael et al. | 303/6 C |

FOREIGN PATENT DOCUMENTS

| | | |
|---|---|---|
| 2106094 | 8/1972 | Fed. Rep. of Germany . |
| 2319726 | 9/1979 | Fed. Rep. of Germany . |
| 2805895 | 12/1979 | Fed. Rep. of Germany . |
| 2926359 | 2/1981 | Fed. Rep. of Germany . |
| 3004964 | 8/1981 | Fed. Rep. of Germany .... 303/22 R |
| 1366807 | 9/1974 | United Kingdom ............... 303/9.63 |
| 2025552 | 1/1980 | United Kingdom ............... 303/9.63 |

OTHER PUBLICATIONS

Brake Handbook Alfred Teves GmbH, 8th Edition, 1984; Bartsch Publishing House.

Primary Examiner—Andres Kashnikow
Assistant Examiner—Timothy Newholm
Attorney, Agent, or Firm—Robert P. Seitter

[57] ABSTRACT

A pressure control unit, in particular for pressure-fluid-actuatable dual-circuit brake systems of automotive vehicles, comprises a housing, a regulating device connected between an inlet and an outlet of a first brake circuit and actuated by an element applicable by a control force. A by-pass for bypassing the regulating device which is controlled by a locking piston acted upon by a second brake circuit. In order to accomplish a small overall length, low-priced manufacture and great functional reliability, the locking piston does not act directly on the regulating device.

1 Claim, 1 Drawing Sheet

PRESSURE CONTROL UNIT WITH LOCKING DEVICE FOR DUAL CIRCUIT BRAKE SYSTEMS

BACKGROUND OF THE INVENTION

The present invention relates to a pressure control unit, in particular for pressure-fluid-actuatable dual-circuit brake systems for automotive vehicles.

Pressure control units of this type serve to reduce the braking pressure in the rear-axle brake circuit of a vehicle in relation to the pressure prevailing at the front-wheel brakes. To optimally adapt the brake behavior—under various load conditions of a vehicle and in consideration of the dynamic axle load distribution during the braking operation—to the brake behavior characterized by the ideal braking pressure characteristic curve, load-responsive pressure control units are provided. These control units are arranged so that there is variation of the change-over pressure on attainment of which pressure reduction commences.

A similar pressure control unit is known from the Brake Handbook Alfred Teves GmbH, 8th Edition 1984, Bartsch Publishing House, Ottobrunn, page 241 to 242. This load-responsive brake force regulator is provided with a locking device wherein a locking piston is arranged co-axially behind a regulating device, the locking piston will act directly on the regulating device on failure of a second brake circuit by moving into abutment with the regulating device and by keeping a control valve opened between the inlet and the outlet of the first brake circuit. This known construction necessitates a locking piston of complicated design and large overall length.

SUMMARY OF THE INVENTION

Therefore, it is an object of the present invention to provide a pressure control unit according to the species which is characterized by a small overall length, low-prices and by great reliability of function.

This object is achieved according to this invention by providing a pressure control unit including a housing having an inlet and an outlet for connecting to a first brake circuit and a regulating device there between. There is also provided a bypass controlled by a locking piston acted upon by a second brake circuit. The locking piston is hydraulically and indirectly controlled. A small overall length is attained because the locking piston is located in a bore of its own, more particularly, in a bore parallel to the bore accommodating the regulating device.

A packing ring having a portion with a U-shaped configuration provides sealing between the locking piston and its associated bore in a manner known per se. The packing ring also has a portion protruding beyond the corresponding end of the locking piston for closing the connection between the locking piston bore and another coaxial bore of smaller diameter, thus, a particularly simple design of the locking piston is allowed.

A design variant of the pressure control unit lends itself to a particularly economical manufacture by permitting the use of a known housing and other parts of a load-responsive twin control unit with only minor modifications to the bores. The second control unit being replaced by the locking piston.

It is particularly advantageous that the locking piston is able to seal three pressure circuits with only two sealing elements.

What is especially advantageous with respect to the wear behavior is that the leakage bore is arranged radially to the locking piston bore in such a manner that it cannot be overridden by either the packing ring or by an O-ring.

It is particularly advantageous for the functional reliability of the pressure control unit that the locking piston is returned to its initial position by a spring element after every termination of braking. As a consequence, it seals are constantly moved and remain elastic.

BRIEF DESCRIPTION OF THE DRAWING

Further favorable features can be gathered from the following description of preferred embodiments of this invention.

In the drawing.

Like parts have been assigned like reference numerals in all illustrations.

DETAILED DESCRIPTION OF A PREFERRED EMBODIMENT

Figure 1:
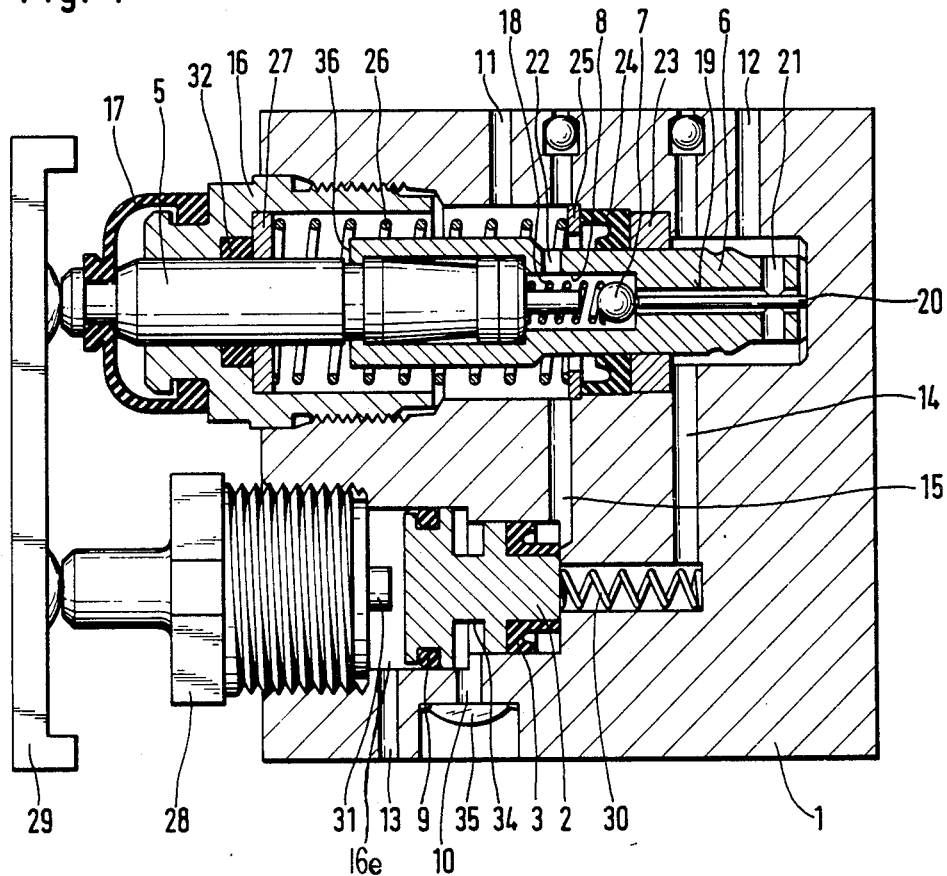
FIG. 1 is a cross-section through an inventive pressure control unit.

The pressure control unit illustrated in FIG. 1 includes a housing 1 incorporating the two stepped main bores for a locking piston 2 and for a regulating device which, substantially, is composed of a coupling portion 5 and a control portion 6. The housing 1 is also formed with an inlet 11 and an outlet 12 of the rear-axle brake circuit, an inlet 13 of the front-axle brake circuit as well as a leakage bore 10 and two connecting bores 15, 14 between the locking and regulating device which extend transversely to the main bores.

Since it gets into contact with the atmosphere, the substantially cylinder-shaped coupling portion 5 of the regulating device is made of stainless steel. It projects into the stepped sleeve-shaped control portion 6 of larger external diameter, with which it is caulked, and is sealingly supported in a closure member 16 that is pressure-tightly screwed to the housing 1. One end of a protective cup 17 engages over the closure member 16, while the other end thereof is secured in an annular groove formed in the end portion of the coupling portion 5 where it projects out of the housing 1. A ball 7 is contained in a recess 8 (reduced diameter fore portion) of the control portion 6. The ball 7 has a valve seat stamped on it and is caused by a spring 18 to move into abutment on the inner end of an axial bore 19 formed in the control portion. A pin 20 is inserted with play into the bore 19. Vertically (as shown in the drawing) to said bore 19 there is formed a cross bore 21 that communicates with the bore 19 and the outlet 12.

At its other end, the spring 18 bears against the end of coupling portion 5 and is guided by a pen formed on the corresponding end for this purpose. The recess 8 is in communication with the connecting bore 11 via a cross bore 22 and the main bore of the regulating device. The control portion 6 is accommodated slidably in a ring 23 and is sealed relative to the housing 1 by a packing ring 24. Abutting on the outward sealing lip of the packing ring 24 is an annular disc 25 which is acted upon by a spring 26 whose other end bears on a ring 27 which, in turn, bears against the closure member 16.

The internal diameter of ring 27 is less than the external diameter of the control portion 6 so that the ring acts as a stop for the end surface 36 of the control portion 6. As a result, the ring 27 serves as a return stroke limiter for the regulating device. Ring 27 also serves to secure a seal 32 between the coupling portion 5 and the closure member 16.

A load-responsive control force is applied to the regulating device by a lever 29. The lever 29 onto which the control force is introduced by a preloaded (non-illustrated) spring likewise abuts a closure screw 28 which closes the other main bore 16e, the bore in which the locking piston 2 is located. The coupling and control portions 5 and 6, respectively, displace in opposition to the actuating force upon attainment of the change-over pressure during a brake operation so that the ball 7, which was previously retained in the opened position by the pin 20, closes the bore 19. Upon further rise of the pressure introduced through the bore 11, the outlet pressure in the bore 12 will be increased according to the ratio of the pressure-applied surfaces of the control portion 6 and the coupling portion 5.

When the inlet pressure is decreased, the pressure drop at the outlet side will first be performed by the regulating device displacing in opposition to the force due to the pressure difference. Further pressure reduction will take place in dependence on the actuating force by the packing ring 24 being overflown by fluid and by the valve seat opening due to actuation of the ball 7 by the pin 20 after the regulating device is in abutment on the housing 1.

The locking piston 2 is disposed in the stepped second main bore which extends in parallel to the bore of the regulating device and which is pressure-tightly closed by the closure screw 28. The locking piston is also of stepped design and for the purpose of sealing is provided with a packing ring 3 on its one side and with an O-ring 9 on its other side.

Figure 2:
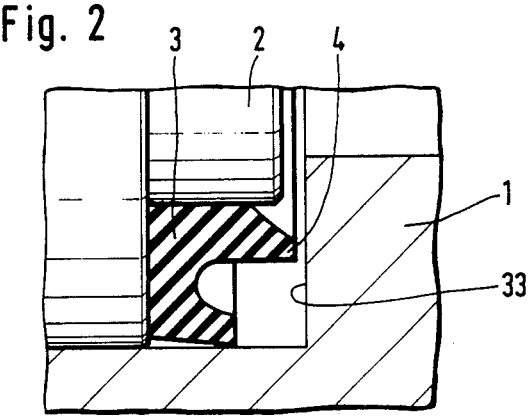
FIG. 2 is an illustration of the packing ring at the locking piston.

With the brake system unpressurized, the locking piston 2 is moved into abutment on a stop 31 caused by the force of a spring 30 incorporated in the rear part of the locking piston bore. The stop 31 is formed on the inner end of the closure screw 28. Upon actuation of the intact brake system, the locking piston 2 is displaced by the pressure of the front-axle brake circuit, connected by the inlet bore 13, in opposition to the force of the spring 30 and is caused to move into abutment with the surface 33 of the housing 1. The packing ring 3 due to its radial abutment provides sealing between the locking piston 2 and its bore. Moreover, the portion 4 of the packing ring 3 which—as can be seen in FIG. 2—projects axially beyond the locking piston seals the rear part of the bore of the locking piston 2 which communicates with the connecting bore 14 leading to the rear outlet-side port 12 of the bore for the regulating device. This allows the pressure to communicate from the bore 11 to the bore 12 only by way of the regulating device.

Connected to the inlet-side port 11 of the main bore for the regulating device is the bore of the locking piston 2 through the connecting bore 15. Both connecting bores 14, 15 are arranged vertically (as seen in FIG. 1) to the two main bores for the regulating device and the locking piston and are closed pressure-tightly at their inlets. The locking piston 2 is stepped in such a manner that the end surface facing the bore 13 forms the largest cross-section of the locking piston 2, to the end that the pressure which is introduced through the bore 13 will reliably overcome the force of the pressure prevailing on the opposite and side and the force of the spring 30.

Between the O-ring 9 and the packing 3, the locking piston 2 is formed with an annular groove 34 which forms a chamber communicating with the leakage bore 10. This chamber is free from pressure fluid when the O-ring 9 and the packing ring 3 function properly. Pressure fluid may enter this chamber and, respectively, into the leakage bore 10 only when the tightness of the elements is fading. The seal-tightness of O-ring 9 and packing ring 3 can thus be monitored by virtue of a rubber packing washer 35 against the entry of water and dirt, which is connected to the housing 1 on a step formed in the leakage bore 10.

When the brake is actuated on failure of the front-axle brake circuit, the locking piston 2 rests against the stop 31 by the force of the spring 30, on the one hand, and by the pressure force out of the rear-axle brake circuit, on the other hand, and releases the passage between the connecting bores 14 and 15 so that the rear-axle brake circuit by-passes the regulating device and the inlet pressure prevailing at the bore 11 will reach the bore 12 and hence the rear-wheel brakes in an unreduced fashion.

What is claimed is:

1. A pressure control unit for use with dual-circuit brake systems, said unit comprising a housing including a first bore having a first inlet and an outlet for connecting the unit to a first brake circuit, a regulating device in said first bore for maintaining a predetermined pressure relationship between the first inlet and the outlet, a by-pass allowing fluid to flow from said first inlet to said outlet and bypassing said regulatory device, a second bore parallel to the first bore and having a second inlet for connecting the unit to a second brake circuit, said second bore being of stepped design, a locking piston in said second bore, said locking piston being moveable in response to fluid pressure sensed at said second inlet for closing said by-pass, said locking piston being moveable in response to fluid presure sensed at said first inlet to open said by-pass, and spring means for opening said by-pass if there is no pressure in said second inlet, said locking piston being also of stepped design with two faces, a first face which is larger than a second face, said first face being in contact with fluid pressure from said second inlet and said second face being in contact with fluid pressure from said first inlet.

* * * * *